UNITED STATES PATENT OFFICE.

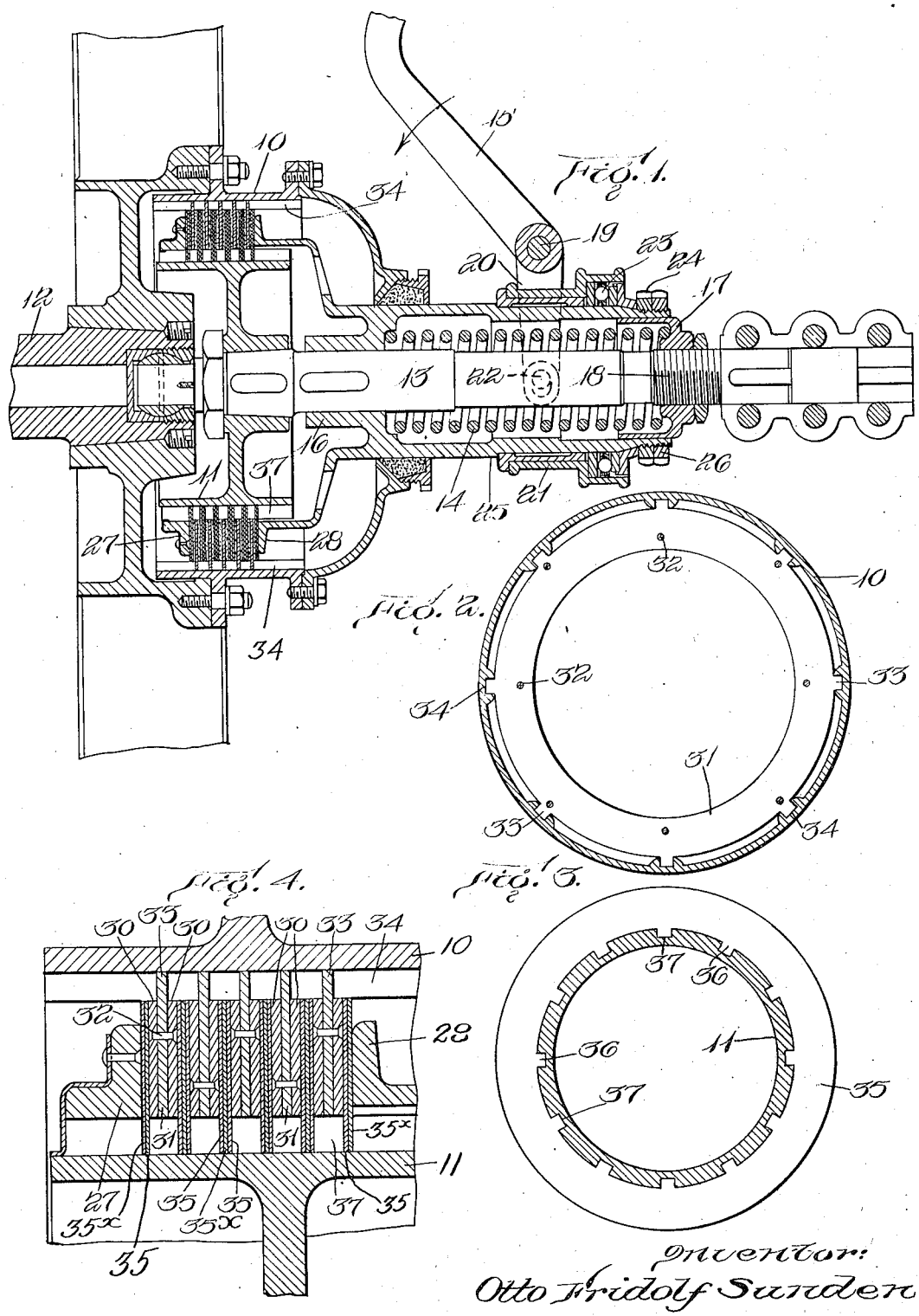

OTTO F. SUNDEN, OF BROCKTON, MASSACHUSETTS, ASSIGNOR OF ONE-HALF TO ELDON B. KEITH, OF BROCKTON, MASSACHUSETTS.

CLUTCH.

1,170,784.      Specification of Letters Patent.      Patented Feb. 8, 1916.

Application filed April 30, 1915. Serial No. 24,914.

*To all whom it may concern:*

Be it known that I, OTTO F. SUNDEN, a citizen of the United States, and resident of Brockton, in the county of Plymouth and State of Massachusetts, have invented certain new and useful Improvements in Clutches, of which the following is a specification.

This invention relates to friction clutches of the so-called multiple disk type. The disks of such clutches are in the form of rings and are usually made of thin metal. They are arranged in a series, in contiguous relation, some of them being splined to the rotary driving member of the clutch and the remainder being splined to the rotary driven member of the clutch. In most clutches of this type the disks of one set alternate with those of the other set. Disks of friction material are interposed between the metal disks in some clutches, while in others inserts of friction material are set into the metal disks, to increase the driving power. The use of friction material causes the generation of a high degree of heat when the clutch is slipping, and the heat so generated causes warping of the metal disks. When a metal disk is warped, excessive pressure is required to spring it so that the full area of its working surface will have contact with the contiguous disk or disks.

One of the objects of the present invention is to provide a clutch which will minimize the warping effect above mentioned.

Another difficulty with clutches of the multiple disk type is that the metal disks, if thin enough to be sprung back to their original flat condition after having been warped, have cut notches in the keyways of one or both of the two main rotary members of the clutch. This cutting is due in part to the fact that the steel of which the disks are made is harder than the steel in which the spline grooves or keyways are formed, and is due in part to the fact that the metal disks of one set are all separated from each other by the interposed disks of the other set. Thus, when the clutch is driving, each key portion of each steel disk cuts or wears a notch in its keyway and becomes caught in such notch so that the clutch will stick when an effort is made to release it. My invention overcomes this difficulty by grouping the thin metal disks of one set instead of having them all separated from each other.

For the purpose of explanation, the disks may be regarded as being arranged in two sets, the driving disks constituting one set and the driven disks constituting the other set. In order to carry out the purposes of the present invention, I divide each of the two sets into a series of groups. Each group of one set comprises three contiguous disks including two disks made of heat-insulating friction material, such as asbestos, and a metal disk interposed between said two heat-insulating disks. These three disks are permanently fastened to each other by suitable means, such as rivets, so that they are to all intents and purposes a unit. Such unit, therefore, comprises a central metal disk faced on both sides with material which has friction property and at the same time heat-insulating property. Each group of the other set comprises a plurality of contiguous, thin, flexible metal disks. There may be two or three disks in each of these groups, but I have found in practice that two disks in each of the end groups and three disks in each of the intermediate groups give good results.

The accompanying drawings show my invention as embodied in clutch mechanism such as that used in automobiles, but it will be readily understood that the design is subject to variation within the scope of the invention according to the requirements of the clutch.

On the drawings: Figure 1 represents a longitudinal section of a clutch in which my invention is embodied in its preferred form, the clutch being applied as shown by this figure. Fig 2 represents a cross section including the outer rotatable member together with one of the clutch disks splined thereto. Fig. 3 represents a cross section through the inner rotatable member together with one of the clutch disks splined thereto. Fig. 4 represents a section, on a larger scale, of a portion of the clutch mechanism in the same condition as that represented in Fig. 1.

The same reference characters indicate the same parts wherever they occur.

Referring first to Fig. 1, the outer rotatable member of the clutch is indicated at 10, and the inner rotatable member is indicated at 11. According to the design shown, the member 10 is the driving member and the member 11 is the driven member, but the outer member could be the driven member and the inner member could be the driving member within the scope of this invention. The members 10 and 11 are arranged substantially concentrically, the former being carried by a driving shaft 12 and the latter being carried by a driven shaft 13.

The left-hand end of a helical compression spring 14 bears against the hub 16 of a sliding sleeve 25, and the right-hand end of said spring is seated against a collar 17 carried by the shaft. The collar and shaft have coöperative screw-threads which are indicated as a whole at 18. The collar therefore serves as an abutment against which the spring acts to move the sleeve to the left. Movement to the right is caused by moving the lever 15 in the direction indicated by the arrow in Fig. 1. The fulcrum member of this lever is indicated at 19. A shipper fork 20 straddles a collar 21 and is connected to the latter by studs 22. A suitable antifriction thrust bearing, indicated as a whole at 23, is arranged to transmit axial movement from collar 21 to a collar 24 fastened to the sleeve 25. As shown, the collar 24 and sleeve 25 are connected by coöperative screw-threads, and the collar 24 is secured by a binding nut 26.

Rotation is transmitted from the member 10 to the member 11 by a series of disks which are arranged between a ring 27 and a flange 28. Said ring is carried by and fastened rigidly to the member 11. The flange 28 is formed upon the sleeve 25 and acts, under the influence of spring 14, to press the disks against each other and against the rings 27.

The disks may be regarded, for the purpose of explanation, as comprising two sets, those of one set being carried by and rotatable with the member 10, and those of the other set being carried by and rotatable with the member 11. The disks of the first set are divided into groups each of which comprises three disks, to wit: two disks 30, 30 of heat-insulating friction material, such as or including asbestos, and a metal disk 31 interposed between said two disks. These three disks are rigidly fastened to each other by suitable means such as rivets 32. Each metal disk 31 has key portions 33 which are arranged to slide in keyways 34 formed in the member 10. The disks of said other set are also divided into groups each of which, excepting the end groups, comprises at least two, but preferably three, thin flexible metal disks. The latter are indicated at 35 and 35$^x$, the disks 35$^x$ being, in each group excepting the two end groups, interposed between two disks 35. The disks 35 and 35$^x$ are made of thin sheet steel and are so flexible as to be readily sprung, if necessary, by the stress of spring 14 to conform to any irregularities which may require springing in order to enable them to have their maximum area of contact. Each disk 35 and 35$^x$ has key portions 36 which are arranged to slide in keyways 37 formed in the member 11. The disks 35$^x$ could be omitted, in which case the disks 35 of each intermediate group would lie in contact with each other; but I prefer to employ the disks 35$^x$ as shown, for reasons which will appear.

As hereinbefore stated, the disks 35, 35$^x$ are made of thin flexible steel which is harder than the member 11. A single steel disk in place of two or three would be effective so far as transmitting rotation is concerned, for its two opposite faces would be engaged by two friction disks 30. If the supposed single metal disk were so thin as to be sprung as required for the efficient working of the clutch, its key portions would cut notches in the keyways of the member 11 and would become caught in such notches so that the clutch would stick when it were attempted to release it. This would be due to isolation of the several metal disks from each other. Furthermore, a single isolated metal disk of the thickness shown would have heat generated upon both of its faces, and it would become heated to so great a temperature that its surfaces would scale, and gouge the disks 30. One advantage of providing two disks 35 between each two adjacent friction disks 30 is that each of the former has heat generated on only one of its surfaces. Another advantage is that the tendency to cut notches in the keyways of the member 11 is greatly reduced. These two advantages are amplified by interposing a disk 35$^x$ between each two disks 35. I have found in practice that the disks 35, 35$^x$ when arranged as shown do not become excessively heated or warped, and they do not cut or wear notches in the keyways. The clutch therefore releases immediately and uniformly in consequence of retractory movement of the sleeve 25.

The conditions which call for relatively thin metal for the disks 35, 35$^x$ do not apply to the disks 31. The latter do not have any rubbing contact, and they are insulated from the source of heat so effectively that there would never be any warping. It is not necessary, therefore, that the disks 31 be capable of being sprung. The transmission of rotation by them from the member 10 to the disks 30 is positive. The disks 35, on the other hand, transmit rotation frictionally from the disks 30 to the member 11. When the clutch is applied, the two or three disks 35, 35$^x$ of each group, as the case may be, become to all intents and purposes a unit and have, in the aggregate, sufficient width of bearing in the keyways 37 to keep the keyways smooth and free from notches.

I claim:

1. In a multiple disk friction clutch, a rotary driving member, a rotary driven member, a series of groups of disks including two groups coacting with one of said rotary members and a third group arranged between said two groups and coacting with the other one of said rotary members, each of said two groups comprising a metal disk and a disk of heat-insulating friction material fastened thereto, each said metal disk having splined engagement with said one of said rotary members and each said disk of heat-insulating material being arranged to coact with said third group, said third group comprising a plurality of contiguous disks of thin flexible metal having splined engagement with said other one of said rotary members, and means arranged to press said disks against each other to apply the clutch.

2. In a multiple disk friction clutch, a rotary driving member, a rotary driven member, a series of groups of disks including two groups coacting with one of said rotary members and a third group arranged between said two groups and coacting with the other one of said rotary members, each of said two groups comprising a plurality of contiguous disks of thin flexible metal, said third group comprising three disks, to wit, two disks of heat-insulating friction material and a metal disk between and fastened to said two disks, said metal disk having splined engagement with said other one of said rotary members, the two inner disks of said two groups having splined engagement with said one of said rotary members, and means arranged to press said disks against each other to apply the clutch.

3. A multiple disk friction clutch comprising a rotary driving member, a rotary driven member, a series of disks carried by said driving member, a series of disks carried by said driven member, one of said series comprising a plurality of sub-groups each of which has three disks, to wit, two heat-insulating friction disks and a metal disk interposed between and fastened to said two disks, the several said metal disks having splined engagement with one of said members, the other one of said series comprising a plurality of sub-groups arranged to alternate with the first said sub-groups, each sub-group of said other series comprising a plurality of relatively thin flexible metal disks, the latter disks having splined engagement with the other one of said members, and means arranged to press said disks against each other.

In testimony whereof I have affixed my signature, in presence of two witnesses.

OTTO F. SUNDEN.

Witnesses:
JAMES P. KEITH,
ERNEST W. STEDMAN.